(12) United States Patent
Koide et al.

(10) Patent No.: US 10,279,811 B2
(45) Date of Patent: May 7, 2019

(54) VEHICLE SPEED CONTROL DEVICE FOR INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Kariya (JP); Norihiko Kato, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 79 days.

(21) Appl. No.: 15/465,826

(22) Filed: Mar. 22, 2017

(65) Prior Publication Data

US 2017/0274904 A1 Sep. 28, 2017

(30) Foreign Application Priority Data

Mar. 25, 2016 (JP) .................................. 2016-062124

(51) Int. Cl.
*B60W 30/18* (2012.01)
*B60W 50/10* (2012.01)
(Continued)

(52) U.S. Cl.
CPC ...... *B60W 30/18027* (2013.01); *B60W 10/06* (2013.01); *B60W 50/10* (2013.01);
(Continued)

(58) Field of Classification Search
CPC ...... F02D 31/001; F02D 41/045; F02D 41/10; F02D 2200/501; F02D 2200/602;
(Continued)

(56) References Cited

U.S. PATENT DOCUMENTS 6,052,644 A 4/2000 Murakami et al.
2004/0195022 A1 10/2004 Inoue
(Continued)

FOREIGN PATENT DOCUMENTS

EP 2211042 A1 7/2010
GB 2 350 699 A 12/2000
(Continued)

OTHER PUBLICATIONS

Communication dated Aug. 30, 2017 from the European Patent Office in counterpart European application No. 17161782.2.
(Continued)

*Primary Examiner* — Hung Q Nguyen
*Assistant Examiner* — Mark L. Greene
(74) *Attorney, Agent, or Firm* — Sughrue Mion, PLLC

(57) ABSTRACT

A vehicle speed control device for an industrial vehicle is configured to control a vehicle speed of the industrial vehicle. The vehicle speed control device includes an operation detector that is configured to detect whether an accelerator pedal is being operated and a controller that is configured to control the vehicle speed of the industrial vehicle by controlling the rotation speed of the engine. The controller is configured to derive a vehicle speed limit value that increases during an operated state of the accelerator pedal and decreases during a non-operated state of the accelerator pedal, and set an upper limit value of the vehicle speed to the derived vehicle speed limit value.

9 Claims, 3 Drawing Sheets

(51) Int. Cl.
*B60W 10/06* (2006.01)
*F02D 31/00* (2006.01)
*F02D 41/00* (2006.01)
*B60W 50/00* (2006.01)

(52) U.S. Cl.
CPC ....... *F02D 31/001* (2013.01); *F02D 41/0097* (2013.01); *B60W 2050/0083* (2013.01); *B60W 2300/121* (2013.01); *B60W 2300/152* (2013.01); *B60W 2300/16* (2013.01); *B60W 2520/10* (2013.01); *B60W 2540/10* (2013.01); *B60W 2710/0644* (2013.01); *B60Y 2200/15* (2013.01); *B60Y 2200/221* (2013.01); *B60Y 2200/416* (2013.01); *F02D 2200/501* (2013.01); *F02D 2200/604* (2013.01); *Y02T 10/52* (2013.01); *Y02T 10/84* (2013.01)

(58) Field of Classification Search
CPC .......... B60W 10/06; B60W 30/18027; B60W 50/10; B60W 2050/0083; B60W 2300/121; B60W 2300/152; B60W 2520/10; B60W 2540/10; B60W 2710/0644; B60W 2720/10–2720/106; B60Y 2200/15; B60Y 2200/221; Y02T 10/52; Y02T 10/84
See application file for complete search history.

(56) References Cited

U.S. PATENT DOCUMENTS

| | | |
|---|---|---|
| 2007/0021898 A1 | 1/2007 | Proemm |
| 2007/0080025 A1 | 4/2007 | Yamada et al. |
| 2011/0160978 A1* | 6/2011 | Yuzawa ................ B60W 10/06 701/93 |
| 2014/0309829 A1* | 10/2014 | Higashitani ............. B60L 15/20 701/22 |
| 2015/0081191 A1 | 3/2015 | Kato et al. |
| 2015/0191160 A1 | 7/2015 | Fairgrieve et al. |

FOREIGN PATENT DOCUMENTS

| | | |
|---|---|---|
| JP | 2001001792 A | 1/2001 |
| JP | 2003-041963 A | 2/2003 |
| JP | 2007119245 A | 5/2007 |
| JP | 201559461 A | 3/2015 |
| JP | 2015-158099 A | 9/2015 |

OTHER PUBLICATIONS

Communication dated May 29, 2018 from the Japanese Office Action in counterpart Japanese application No. 2016-062124.

* cited by examiner

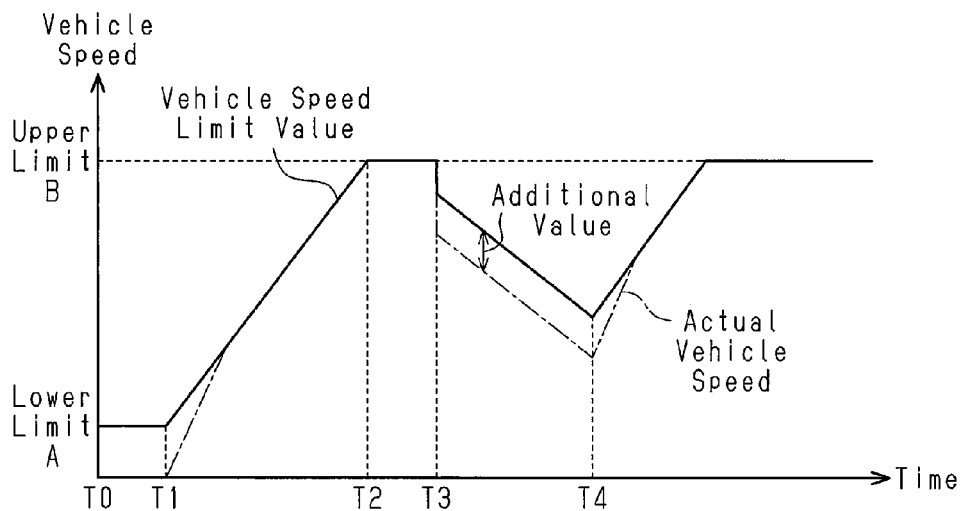
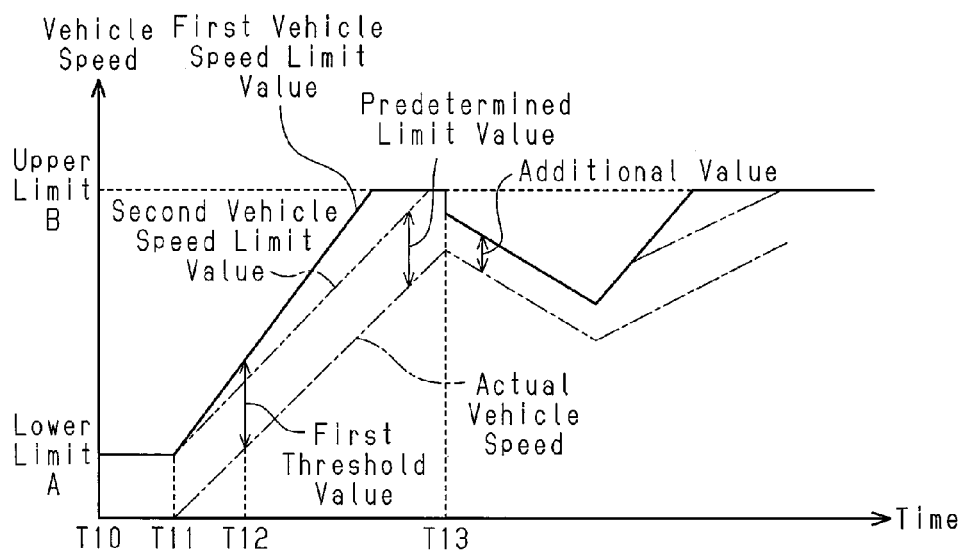

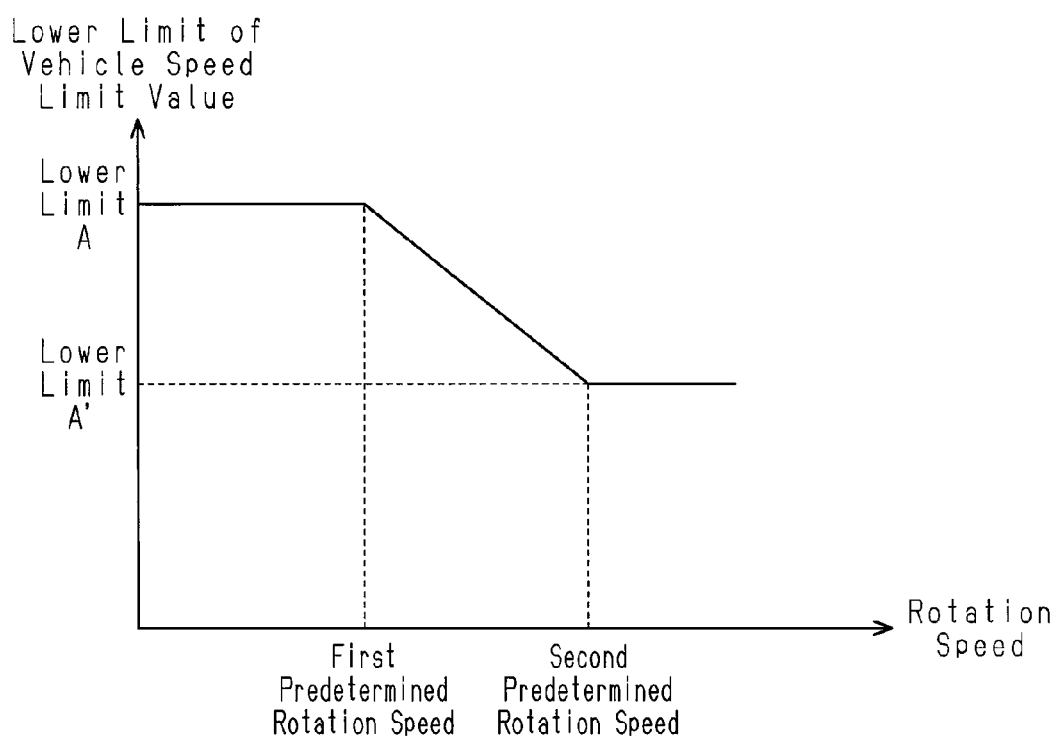

VEHICLE SPEED CONTROL DEVICE FOR INDUSTRIAL VEHICLE

BACKGROUND OF THE INVENTION

The present invention relates to a vehicle speed control device that controls the speed of an industrial vehicle.

Conventionally, industrial vehicles have been known to travel by using an engine as a drive source. For example, refer to Japanese Laid-Open Patent Publication No. 2015-158099. The engine of this type of industrial vehicle is coupled to the drive wheels via a torque converter and a transmission. In the engine, fuel is injected from the fuel injection valve, and the power of the engine changes in accordance with the fuel injection amount. The vehicle speed control device adjusts the power of the engine to control the vehicle speed of the industrial vehicle.

Incidentally, it has been desired to improve the fuel economy of industrial vehicles that use an engine as a drive source.

SUMMARY OF THE INVENTION

Accordingly, it is an objective of the present invention to provide a vehicle speed control device for an industrial vehicle capable of improving the fuel economy of an industrial vehicle.

To achieve the foregoing objective and in accordance with one aspect of the present invention, a vehicle speed control device for an industrial vehicle is provided. The vehicle speed control device is configured to be mounted on an industrial vehicle that performs a traveling operation and a cargo handling operation by using an engine as a drive source, and is configured to control a vehicle speed of the industrial vehicle. The vehicle speed control device includes an operation detector that is configured to detect whether an accelerator pedal is being operated and a controller that is configured to control the vehicle speed of the industrial vehicle by controlling a rotation speed of the engine. The controller is configured to derive a vehicle speed limit value that increases during an operated state of the accelerator pedal and decreases during a non-operated state of the accelerator pedal. The controller is also configured to set an upper limit value of the vehicle speed to the derived vehicle speed limit value.

To achieve the foregoing objective and in accordance with another aspect of the present invention, a vehicle speed control device for an industrial vehicle is provided. The vehicle speed control device is configured to be mounted on an industrial vehicle that performs a traveling operation and a cargo handling operation by using an engine as a drive source, and is configured to control a vehicle speed of the industrial vehicle. The vehicle speed control device includes a vehicle speed detector that is configured to detect an actual vehicle speed of the industrial vehicle and a controller that is configured to control the vehicle speed of the industrial vehicle by controlling a rotation speed of the engine. The controller is configured to derive a vehicle speed limit value that is obtained by adding a predetermined limit value to the actual vehicle speed detected by the vehicle speed detector. The controller is also configured to set an upper limit value of the vehicle speed to the derived vehicle speed limit value.

To achieve the foregoing objective and in accordance with yet another aspect of the present invention, a vehicle speed control device for an industrial vehicle is provided. The vehicle speed control device is configured to be mounted on an industrial vehicle that performs a traveling operation and a cargo handling operation by using an engine as a drive source, and is configured to control a vehicle speed of the industrial vehicle. The vehicle speed control device includes an operation detector that is configured to detect whether an accelerator pedal is being operated, a vehicle speed detector that is configured to detect an actual vehicle speed of the industrial vehicle, and a controller that is configured to control the vehicle speed of the industrial vehicle by controlling a rotation speed of the engine. The controller is configured to derive a first vehicle speed limit value that increases during an operated state of the accelerator pedal and decreases during a non-operated state of the accelerator pedal, and a second vehicle speed limit value that is obtained by adding a predetermined limit value to the actual vehicle speed detected by the vehicle speed detector. The controller is also configured to employ the second vehicle speed limit value as the vehicle speed limit value when a deviation between the first vehicle speed limit value and the actual vehicle speed is greater than or equal to a predetermined threshold value. The controller is further configured to set an upper limit value of the vehicle to the vehicle speed limit value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a time chart representing control performed by a vehicle speed control device according to a first embodiment;

FIG. 3 is a time chart representing control performed by a vehicle speed control device according to a second embodiment; and FIG. 4 is an explanatory diagram showing control performed by a vehicle speed control device according to a third embodiment.

DETAILED DESCRIPTION OF THE PREFERRED EMBODIMENTS

First Embodiment

Figure 1:
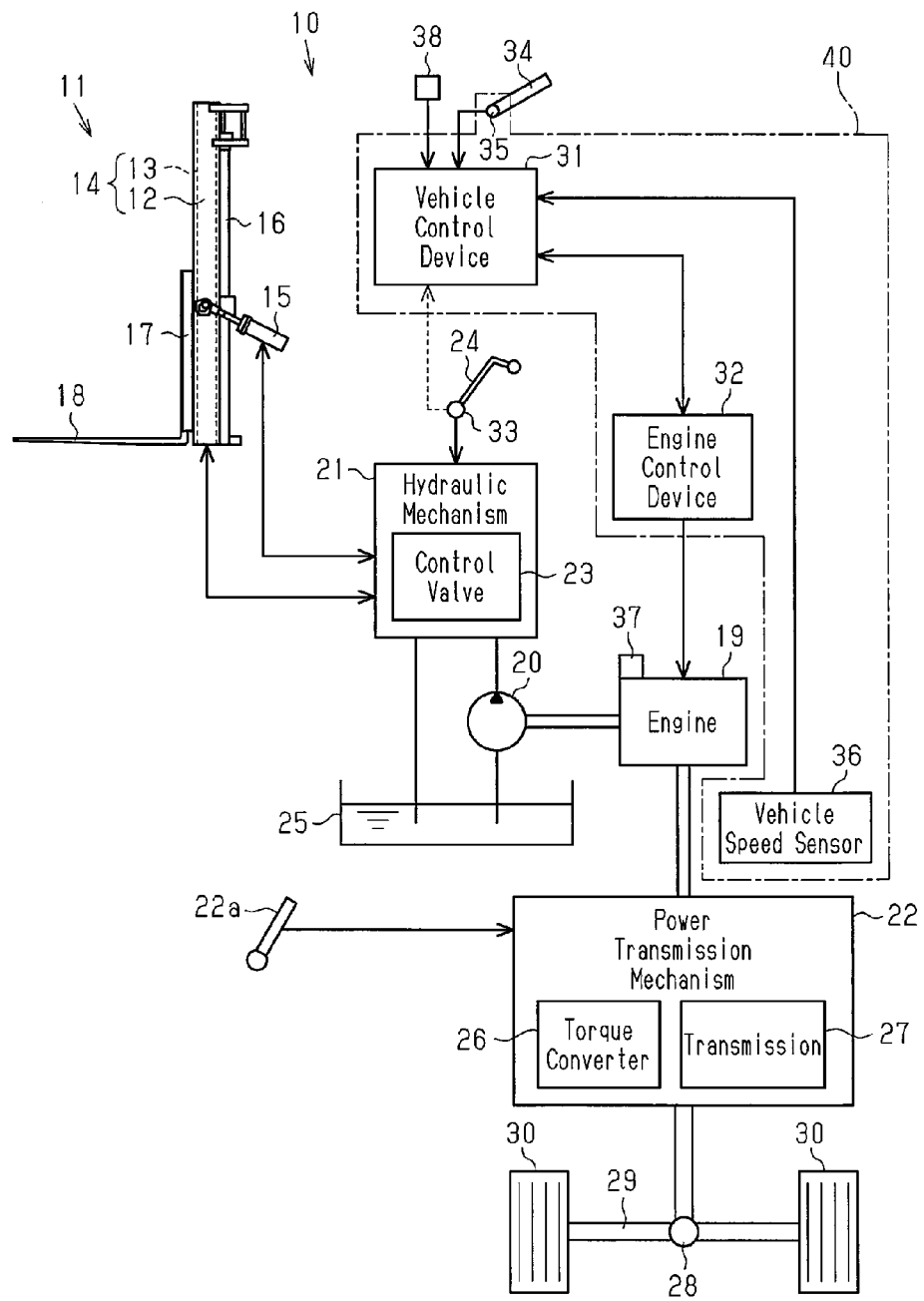
FIG. 1 is a schematic diagram of a forklift.

A vehicle speed control device for an industrial vehicle according to a first embodiment will now be described.

As shown in FIG. 1, a forklift 10, which is an industrial vehicle, includes a cargo handling device 11. The cargo handling device 11 includes a multistage mast assembly 14. The mast assembly 14 includes right and left outer masts 12 and right and left inner masts 13. A hydraulic tilt cylinder 15 is coupled to each outer mast 12. A hydraulic lift cylinder 16 is coupled to each inner mast 13. The mast assembly 14 is tilted forward or rearward in the vehicle front-rear direction when hydraulic oil is supplied to or drained from the tilt cylinders 15. The inner masts 13 are lifted or lowered in the vehicle vertical direction when hydraulic oil is supplied to or discharged from the lift cylinders 16. A fork 18 is attached to the inner masts 13 with a lift bracket 17. When the lift cylinders 16 are actuated to lift or lower the inner masts 13, the fork 18 is lifted or lowered accordingly together with the lift bracket 17.

The forklift 10 includes an engine 19, a hydraulic pump 20, and a hydraulic mechanism 21. The engine 19 is a drive source for travelling operation and cargo handling operation of the forklift 10. The hydraulic pump 20 is driven by the engine 19. Hydraulic oil discharged from the hydraulic pump 20 is supplied to the hydraulic mechanism 21. The forklift 10 also includes a power transmission mechanism 22 that transmits the power of the engine 19 and an oil tank 25 that stores hydraulic oil.

The hydraulic mechanism 21 includes a control valve 23 that controls supply and drainage of hydraulic oil to and from the tilt cylinders 15 and the lift cylinders 16. In addition, a cargo handling member 24 is mechanically coupled to the control valve 23. The driver operates the cargo handling member 24 to instruct operations of the tilt cylinders 15 and the lift cylinders 16. The control valve 23 is selectively opened and closed through operation of the cargo handling member 24. The hydraulic oil in the oil tank 25 is pumped up by the hydraulic pump 20 and supplied to the tilt cylinders 15 and the lift cylinders 16 via the hydraulic mechanism 21. The hydraulic oil drained from the tilt cylinders 15 and the lift cylinders 16 is returned to the oil tank 25 via the hydraulic mechanism 21.

The power transmission mechanism 22 includes a torque converter 26 and a transmission 27, which are configured to transmit power. An axle 29 is coupled to the engine 19 via the power transmission mechanism 22 and a differential gear 28. Drive wheels 30 are coupled to the axle 29. The power of the engine 19 is transmitted to the drive wheel 30 via the power transmission mechanism 22, the differential gear 28, and the axle 29.

An inching pedal 22a for performing an inching operation is provided at the driver's seat of the forklift 10. The inching pedal 22a is configured to be interlocked with the brake pedal (not shown) provided at the driver's seat from the middle of its operation. The inching pedal 22a is operated independently from (not interlocked with) the brake pedal in an inching region, but is interlocked with the brake pedal when outside the inching region (when in the braking region). The inching region refers to a region in which the inching pedal 22a is depressed and the clutch is partially engaged. The braking region refers to a region in which braking force is applied to the forklift 10.

The forklift 10 has a vehicle control device 31 and an engine control device 32. The vehicle control device 31 and the engine control device 32 are electrically connected to each other. In the present embodiment, the vehicle control device 31 and the engine control device 32 constitute a controller.

The vehicle control device 31 and the engine control device 32 are each constituted by, for example, at least one dedicated hardware circuit and/or at least one processor (a control circuit) that operates in accordance with a computer program (software). That is, the vehicle control device 31 and the engine control device 32 are each constituted by an electronic control unit having electric circuitry that is programmed to execute desired procedures. The processor includes a CPU and memories such as a RAM and ROM. The memories store program codes or instructions configured to cause the processor to execute processes. The memories, or computer readable media, include any type of media that are accessible by general-purpose computers and dedicated computers.

The vehicle control device 31 is electrically connected to a detection sensor 33 and an accelerator sensor 35. The detection sensor 33 is configured to detect the operation state (the operation amount and the operation direction) of the cargo handling member 24 and to output the detected operation state. The accelerator sensor 35 is configured to detect the operation amount of the accelerator pedal 34 and to output the detected operation amount. When the operation amount detected by the accelerator sensor 35 is zero, the vehicle control device 31 determines that the accelerator pedal 34 is not being operated, that is, the accelerator pedal 34 is in a non-operated state. When the operation amount detected by the accelerator sensor 35 is greater than zero, the vehicle control device 31 determines that the accelerator pedal 34 is being operated. Therefore, the accelerator sensor 35 functions as an operation detector that detects whether the accelerator pedal 34 is being operated. In addition, a vehicle speed sensor 36 is electrically connected to the vehicle control device 31. The vehicle speed sensor 36 is configured to detect the actual vehicle speed and output the detected actual vehicle speed. The vehicle speed sensor 36 corresponds to a vehicle speed detector.

Further, a mode selector 38 is electrically connected to the vehicle control device 31. The mode selector 38 is a switch for switching the traveling mode between a normal mode and an eco-mode and outputs a detection signal corresponding to the traveling mode selected by the driver.

The normal mode is a traveling mode in which the upper limit value is not set for the vehicle speed of the forklift 10, and the speed of the forklift 10 can be set to a vehicle speed corresponding to the driver's accelerator operation. The eco-mode is a traveling mode in which an upper limit value is set for the vehicle speed of the forklift 10 and the vehicle speed is restricted from being greater than the vehicle speed limit value so that the fuel economy is improved.

A rotation speed sensor 37 is electrically connected to the engine control device 32. The rotation speed sensor 37 is configured to detect the rotation speed of the engine 19 and outputs the detected rotation speed of the engine 19. The engine control device 32 outputs the rotation speed of the engine 19 detected by the rotation speed sensor 37 to the vehicle control device 31. In the forklift 10, since the hydraulic pump 20 is driven by the engine 19, the tilt cylinders 15 and the lift cylinders 16 can be actuated when the driver depresses the accelerator pedal 34 and operates the cargo handling member 24. In the present embodiment, the vehicle control device 31, the engine control device 32, the accelerator sensor 35, and the vehicle speed sensor 36 constitute a vehicle speed control device 40.

Hereinafter, the vehicle speed control of the forklift 10 performed by the vehicle control device 31 will be described together with the operation.

First, the vehicle speed control performed by the vehicle control device 31 in the normal mode will be described.

The vehicle control device 31 receives the operation amount of the accelerator pedal 34 (accelerator operation amount) from the accelerator sensor 35 and calculates a target vehicle speed based on the operation amount of the accelerator pedal 34. Also, the vehicle control device 31 receives the actual vehicle speed from the vehicle speed sensor 36, calculates a target rotation speed based on the deviation between the target vehicle speed and the actual vehicle speed, and outputs the target rotation speed as the rotation speed command to the engine control device 32. Upon receiving the rotation speed command, the engine control device 32 performs control such that the rotation speed of the engine 19 becomes the target rotation speed, that is, the vehicle speed of the forklift 10 follows the target vehicle speed.

Next, the vehicle speed control performed by the vehicle control device 31 in the eco-mode will be described.

The vehicle control device 31 calculates a target vehicle speed in the same manner as in the normal mode. If the target vehicle speed is greater than the vehicle speed limit value, the vehicle control device 31 replaces the target vehicle speed with the vehicle speed limit value and outputs the replaced value to the engine control device 32. Based on the deviation between the vehicle speed limit value and the actual vehicle speed, the engine control device 32 controls the rotation speed of the engine 19 such that the actual vehicle speed follows the vehicle speed limit value. Through this control, the vehicle speed of the forklift 10 is restrained from exceeding the vehicle speed limit value. The vehicle speed limit value is the upper limit value of the vehicle speed.

In the eco-mode, the vehicle control device 31 varies the vehicle speed limit value depending on whether the accelerator pedal 34 is in an operated state or in a non-operated state. Hereinafter, the variation of the vehicle speed limit value in the eco-mode will be described with reference to FIG. 2. In the following description, for illustrative purposes, it is assumed that the target vehicle speed when the accelerator pedal 34 is being operated is always greater than the vehicle speed limit value. In FIG. 2, the solid line indicates the vehicle speed limit value, and the long dashed short dashed line indicates the actual vehicle speed detected by the vehicle speed sensor 36.

At a point in time T0 shown in FIG. 2, the forklift 10 is in a stopped state (the vehicle speed=0 km/h), and the accelerator pedal 34 is not being operated. The vehicle speed limit value at the point in time T0 is a lower limit A. The lower limit A is a vehicle speed limit value in a state where the forklift 10 is in a stopped state, and is an initial value of the vehicle speed limit value. The lower limit A is set to a speed that ensures the acceleration performance, the gradeability, and the cargo handling performance at the start of the traveling, and is set to a value that is greater than zero and less than 50% of the maximum reachable speed of the forklift 10.

When the accelerator pedal 34 is operated at a point in time T1, the vehicle speed limit value and the actual vehicle speed start increasing. The vehicle control device 31 receives the operation amount of the accelerator pedal 34 from the accelerator sensor 35 at each predetermined control cycle to determine whether the accelerator pedal 34 is being operated. If the accelerator pedal 34 is being operated, the vehicle control device 31 adds a predetermined increase speed to the vehicle speed limit value in the previous control cycle to obtain a new vehicle speed limit value. Accordingly, during the operated state of the accelerator pedal 34, the vehicle speed limit value is increased by a predetermined increase speed at each control cycle. The predetermined increase speed is a constant value that is set to a positive value, so that the rate of increase of the vehicle speed limit value per unit time is less than the normal acceleration required to perform work using the forklift 10. As a result, when traveling of the forklift 10 is started, the actual acceleration is less than the acceleration corresponding to the operation amount of the accelerator pedal 34.

At a point in time T2, the vehicle speed limit value increases to an upper limit B. The upper limit B is set, for example, to the maximum speed reachable by the forklift 10 when the speed is not limited. When the vehicle speed limit value reaches the upper limit B, the vehicle speed limit value is maintained at the upper limit B even during the operated state of the accelerator pedal 34.

When the accelerator pedal 34 enters the non-operated state at a point in time T3, the actual vehicle speed starts decreasing. The vehicle speed limit value during the non-operated state of the accelerator pedal 34 is set to a value obtained by adding a predetermined additional value to the actual vehicle speed. During the non-operated state of the accelerator pedal 34, the actual vehicle speed decreases, and the vehicle speed limit value also decreases in accordance with the decrease in the actual vehicle speed. The predetermined additional value is a constant value and is set to a positive value, which ensures the acceleration performance when the accelerator pedal 34 is switched from the non-operated state to the operated state. When the accelerator pedal 34 is depressed after being released so that the vehicle speed drops to an intermediate speed between the lower limit A and the upper limit B, the actual vehicle speed is deviated. Thus, the engine control device 32 immediately increases the engine torque to maintain the acceleration performance. In the present embodiment, the predetermined additional value is set to be less than the lower limit A.

When the accelerator pedal 34 is operated again at a point in time T4 before the vehicle speed limit value reaches the lower limit A, the vehicle speed limit value and the actual vehicle speed start increasing in the same manner as when the accelerator pedal 34 was operated at the point in time T1.

The above-described embodiment achieves the following advantages.

(1) In the eco-mode, when the target vehicle speed, which is calculated based on the operation amount of the accelerator pedal 34, is greater than the vehicle speed limit value, the vehicle control device 31 outputs the vehicle speed limit value to the engine control device 32. The engine control device 32 controls the engine 19 based on the deviation between the vehicle speed limit value and the actual vehicle speed such that the actual vehicle speed does not exceed the vehicle speed limit value. Although the vehicle speed limit value increases to the upper limit B during the operated state of the accelerator pedal 34, the actual vehicle speed of the forklift 10 is restrained from exceeding the vehicle speed limit value. That is, the acceleration of the forklift 10 is limited. This improves the fuel economy.

(2) The lower limit A of the vehicle speed limit value is set taking into consideration the acceleration performance at the start of traveling. When the initial value (the lower limit) of the vehicle speed limit value were set to be excessively low (for example, zero), the acceleration performance at the start of traveling would be reduced and the workability of the forklift 10 could be reduced. For this reason, the initial value of the vehicle speed limit value is set to the lower limit A in consideration of the acceleration performance at the start of traveling, so that reduction in the acceleration performance at the start of traveling is limited, and reduction in the workability is limited.

(3) In an industrial vehicle having an engine and a motor as drive sources, it is possible to improve the fuel economy by switching the demanded torque to a value less than the normally required torque in the eco-mode. In addition, by compensating the power of the engine with the power of the motor, it is possible to improve the fuel economy while maintaining the vehicle performance (torque). In an industrial vehicle that uses only the engine as the drive source, it is not possible to compensate the power of the engine with a motor. However, as in the present embodiment, the fuel economy can be improved by the vehicle speed limiting function. That is, it is possible to improve the fuel economy of an industrial vehicle in which only the engine is used as the drive source. As a result, it is possible to improve the fuel economy without adding a motor and a battery as an electric power source for the motor, which improves the fuel economy without changing the layout of the industrial vehicle or increasing the costs.

(4) The fuel economy is improved at low cost compared to the case where a fluid type transmission is mounted and the gear ratio is adjusted by the fluid type transmission in an attempt to improve fuel economy.

(5) The vehicle speed limit value increases during the operated state of the accelerator pedal 34, and reaches the maximum speed reachable by the forklift 10 when reaching the upper limit B. Since the actual vehicle speed of the forklift 10 can be increased to the maximum speed, the fuel economy is improved while limiting reduction in the workability.

Second Embodiment

A vehicle speed control device according to a second embodiment will now be described.

The vehicle speed control device 40 of the second embodiment employs one of two vehicle speed limit values as a vehicle speed limit value. The two vehicle speed limit values include a first vehicle speed limit value, which is derived through the same control as the vehicle speed limit value of the first embodiment.

Further, the vehicle control device 31 derives a second vehicle speed limit value by adding a predetermined limit value to the actual vehicle speed detected by the vehicle speed sensor 36. The predetermined limit value in the present embodiment is a constant value and the second vehicle speed limit value is always maintained at a value greater than the actual vehicle speed by the predetermined limit value. The predetermined limit value is set, for example, to a value that can prevent abrupt acceleration of the forklift 10. In the present embodiment, the predetermined limit value is equal to the lower limit A.

Hereinafter, the vehicle speed control of the forklift 10 performed by the vehicle control device 31 of the present embodiment will be described together with the operation. In FIG. 3, the long dashed short dashed line indicates the actual vehicle speed detected by the vehicle speed sensor 36, the solid line indicates the first vehicle speed limit value, and the long dashed double-short dashed line indicates the second vehicle speed limit value. In the following description, for illustrative purposes, it is assumed that the target vehicle speed when the accelerator pedal 34 is being operated is always greater than the vehicle speed limit value.

At a point in time T10 shown in FIG. 3, the forklift 10 is in a stopped state (the vehicle speed=0 km/h), and the accelerator pedal 34 is not being operated. At the point in time T10, at which the forklift 10 is in a stopped state, the vehicle speed limit value is the lower limit A as in the first embodiment.

When the accelerator pedal 34 is operated at a point in time T11, the actual vehicle speed starts increasing. Upon the start of traveling, the vehicle control device 31 outputs the first vehicle speed limit value to the engine control device 32 as the vehicle speed limit value.

When the forklift 10 is carrying a cargo, the acceleration of the forklift 10 may be less than the rate of increase of the first vehicle speed limit value per unit time. In this case, the longer the operation time of the accelerator pedal 34, the greater the deviation between the actual vehicle speed of the forklift 10 and the first vehicle speed limit value becomes. As a result, if the vehicle speed limit value is always set to the first vehicle speed limit value, the acceleration of the forklift 10 may not be limited after unloading the cargo. That is, there is a possibility that the vehicle speed limitation may not function.

In this regard, when the deviation between the first vehicle speed limit value and the actual vehicle speed becomes greater than or equal to a first threshold value, which is a predetermined threshold value, at a point in time T12, the vehicle control device 31 employs the second vehicle speed limit value as the vehicle speed limit value, and outputs it to the engine control device 32. In the present embodiment, the first threshold value is set to a value greater than the predetermined limit value (the lower limit A). When the deviation between the first vehicle speed limit value and the actual vehicle speed becomes less than a second threshold value, the vehicle control device 31 puts the vehicle speed limit value back to the first vehicle speed limit value. The second threshold value may be any value less than or equal to the first threshold value and does not need to be the same value as the first threshold value.

The engine control device 32 sets the vehicle speed limit value to the second vehicle speed limit value and controls the rotation speed of the engine 19 such that the actual vehicle speed follows the vehicle speed limit value based on the deviation between the vehicle speed limit value and the actual vehicle speed. Through this control, the vehicle speed of the forklift 10 is restrained from exceeding the vehicle speed limit value, and the vehicle speed limit value becomes the upper limit of the vehicle speed.

When the accelerator pedal 34 enters the non-operated state at a point in time T13, the actual vehicle speed starts decreasing. The vehicle speed limit value during the non-operated state of the accelerator pedal 34 is calculated through the same control as the vehicle speed limit value during the non-operated state of the accelerator pedal 34 in the first embodiment. That is, the vehicle speed limit value during the non-operated state of the accelerator pedal 34 is a value obtained by adding a predetermined additional value to the actual vehicle speed.

Therefore, in addition to the advantages of the first embodiment, the present embodiment achieves the following advantages.

(6) The vehicle control device 31 switches the vehicle speed limit value from the first vehicle speed limit value to the second vehicle speed limit value when the deviation between the actual vehicle speed and the first vehicle speed limit value becomes greater than or equal to the first threshold value. Since the second vehicle speed limit value is a value obtained by adding the predetermined limit value to the actual vehicle speed, the deviation between the actual vehicle speed and the vehicle speed limit value is prevented from becoming excessively great. Therefore, the vehicle speed limitation is restrained from virtually stopping functioning due to the deviation between the actual vehicle speed and the vehicle speed limit value being excessively great.

(7) The second vehicle speed limit value is a value obtained by adding the predetermined limit value to the actual vehicle speed. When the vehicle speed limit value is set to the second vehicle speed limit value, the deviation between the actual vehicle speed and the vehicle speed limit value is maintained at the predetermined limit value. Then, the engine 19 is controlled based on the actual vehicle speed and the vehicle speed limit value, of which the deviation from the actual vehicle speed is maintained at the predetermined limit value, so that the power of the engine 19 is restrained from increasing excessively. This improves the fuel economy.

Third Embodiment

A vehicle speed control device according to a third embodiment will now be described. The vehicle speed control device according to the third embodiment changes the lower limit of the vehicle speed limit value and the predetermined limit value in accordance with the rotation speed of the engine.

As shown in FIG. 4, when the rotation speed of the engine 19 is greater than a predetermined first predetermined rotation speed, the lower limit of the vehicle speed limit value and the predetermined limit value are gradually decreased. When the rotation speed of the engine 19 is less than the first predetermined rotation speed, the lower limit A, which is described in the first embodiment and the second embodiment, is the lower limit of the vehicle speed limit value. Although only the lower limit of the vehicle speed limit value is shown in FIG. 4, the predetermined limit value is also reduced in the same manner as the lower limit.

For example, a value greater than or equal to the rotation speed of the engine 19 at the time of idling is set as the first predetermined rotation speed. In the present embodiment, the lower limit of the vehicle speed limit value and the predetermined limit value are gradually reduced to a second predetermined rotation speed, which is greater than the first predetermined rotation speed. Then, at the second predetermined rotation speed, the lower limit of the vehicle speed limit value is set to a lower limit A', which is less than the lower limit A. As the second predetermined rotation speed, for example, a value less than or equal to the no-load maximum rotation speed (NMR rotation speed) of the engine 19 is set.

Operation of the vehicle speed control device 40 of the present embodiment will now be described.

When performing a cargo handling operation, the inching pedal 22a is operated to switch the power for the traveling operation to the power for the cargo handling operation. Then, the cargo handling operation is performed by depressing the accelerator pedal 34 and operating the cargo handling member 24. For this reason, during the cargo handling operation, the forklift 10 does not travel regardless of the rotation speed of the engine 19 (vehicle speed=0 km/h).

The vehicle control device 31 reduces the lower limit of the vehicle speed limit value in accordance with the rotation speed of the engine 19, so that the lower limit of the vehicle speed limit value becomes small even if the forklift 10 is not traveling. Therefore, when the operation of the inching pedal 22a is canceled with the accelerator pedal 34 being operated, and the power is switched from the cargo handling operation to the traveling operation, traveling of the forklift 10 is started with the lower limit of the vehicle speed limit value being small.

The above-described embodiment achieves the following advantages.

(8) The cargo handling operation is performed by operating the accelerator pedal 34. Thus, if the power is switched from the cargo handling operation to the traveling operation in a state where the accelerator pedal 34 is being operated, an abrupt acceleration occurs and the fuel economy may be reduced. When the rotation speed of the engine 19 is greater than the first predetermined rotation speed, decreasing the lower limit of the vehicle speed limit value and the predetermined limit value restrains the vehicle speed from being increased in a short time. That is, the industrial vehicle is restrained from being abruptly accelerated.

The above described embodiments may be modified as follows.

The present invention may be applied to a vehicle control device for an industrial vehicle that obtains a value by adding a predetermined limit value to the actual vehicle speed and outputs the obtained value to the engine control device 32 as a vehicle speed limit value. In other words, the vehicle speed control device 40 may always set the vehicle speed limit value to the second vehicle speed limit value of the second embodiment. Even in this case, since the deviation between the actual vehicle speed and the vehicle speed limit value is maintained at the predetermined limit value, excessive increase in the power of the engine 19 is prevented, and the fuel economy is improved.

In the second embodiment, the smaller one of the first vehicle speed limit value and the second vehicle speed limit value may be employed as the vehicle speed limit value. In this case, as the predetermined limit value, a value greater than the value of the lower limit A is employed. When the deviation between the actual vehicle speed and the first vehicle speed limit value exceeds the predetermined limit value, the vehicle speed limit value is set to the second vehicle speed limit value. Therefore, with the predetermined limit value being the first threshold value, the vehicle speed limit value is switched between the first vehicle speed limit value and the second vehicle speed limit value.

The predetermined limit value of the second embodiment may be variable. For example, the predetermined limit value may be varied in accordance with the vehicle speed.

In the third embodiment, when the rotation speed of the engine 19 is greater than the first predetermined rotation speed, only the lower limit of the vehicle speed limit value may be reduced. In this case, the vehicle speed control of the third embodiment can be applied to both of the vehicle speed control device 40 of the first embodiment and the vehicle speed control device 40 of the second embodiment. Also, in the third embodiment, when the rotation speed of the engine 19 is greater than the first predetermined rotation speed, only the predetermined limit value may be reduced.

In the third embodiment, when the rotation speed of the engine 19 is greater than the first predetermined rotation speed, the lower limit of the vehicle speed limit value and the predetermined limit value may be reduced to the lower limit A' regardless of the rotational speed of the engine 19. That is, when the rotation speed of the engine 19 is greater than the first predetermined rotation speed, the lower limit of the vehicle speed limit value and the predetermined limit value may be instantly reduced to the lower limit A'.

In each of the above illustrated embodiments, the lower limit of the vehicle speed limit value may be a value different from those in the embodiments as long as the lower limit of the vehicle speed limit value is zero or greater and restricts abrupt acceleration of the forklift 10.

In each of the above illustrated embodiments, a limit is imposed on the vehicle speed when the eco-mode is selected. However, the present invention may applied to a forklift 10 of which the vehicle speed is always limited. In this case, the forklift 10 does not need to have the eco-mode.

In each of the above illustrated embodiments, when the eco-mode is selected, the vehicle speed may always be controlled based on the deviation between the vehicle speed limit value and the actual vehicle speed without calculating the target vehicle speed corresponding to the operation amount of the accelerator pedal 34.

In each of the above illustrated embodiments, the industrial vehicle may be any industrial vehicle such as a tractor, a truck-mounted crane, or the like.

In each of the above illustrated embodiments, switching of the traveling mode may be performed by the vehicle control device 31 checking the state of the mode selector 38.

In each of the above illustrated embodiments, the normal mode may be a traveling mode in which a limit is imposed on the maximum speed or a traveling mode on which is imposed a vehicle speed limitation that is laxer than that in the eco-mode.

In each of the above illustrated embodiments, the switching between the power for the traveling operation and the power for the cargo handling operation may be performed by the clutch.

The vehicle control device 31 and the engine control device 32 may be integrated. That is, the vehicle speed control device 40 may be configured to include one controller having the functions of both the vehicle control device 31 and the engine control device 32.

The content to be controlled may be changed between the normal mode and the eco-mode. For example, in the eco-mode, the operation of the vehicle control device 31 may be stopped and the engine 19 may be controlled only by the engine control device 32. Specifically, the engine control device 32 derives the vehicle speed limit value by itself, and controls the rotation speed of the engine 19 with the vehicle speed limit value as the upper limit value.

In the case where the direction lever, which is operated by the driver to instruct the traveling operation, is in neutral, or when the inching pedal 22a is not being operated, the cargo handling performance may be prioritized and the vehicle speed limitation may be canceled. This configuration requires a sensor that detects whether the inching pedal 22a is being operated and outputs the detected operation state to the vehicle control device 31.

When the rotation speed of the engine 19 is significantly less than the rotation speed at the time of idling, the vehicle speed limitation may be canceled in order to prevent the engine from stalling.

Therefore, the present examples and embodiments are to be considered as illustrative and not restrictive and the invention is not to be limited to the details given herein, but may be modified within the scope and equivalence of the appended claims.

The invention claimed is:

1. A vehicle speed control device for an industrial vehicle, wherein the vehicle speed control device is configured to be mounted on an industrial vehicle that performs a traveling operation and a cargo handling operation by using an engine as a drive source, and is configured to control a vehicle speed of the industrial vehicle, the vehicle speed control device comprising:
 a sensor configured to detect whether an accelerator pedal is being operated; and
 a controller programmed to:
  derive a vehicle speed limit value that increases during an operated state of the accelerator pedal and decreases during a non-operated state of the accelerator pedal,
  set an upper limit value of the vehicle speed to the vehicle speed limit value,
  calculate a target vehicle speed based on an operation amount of the accelerator pedal,
  replace the target vehicle speed with the vehicle speed limit value when the target vehicle speed is greater than the vehicle speed limit value,
  calculate a target rotation speed of the engine based on a deviation between the target vehicle speed and an actual vehicle speed, and
  control the engine such that a rotation speed of the engine becomes the target rotation speed.

2. The vehicle speed control device for an industrial vehicle according to claim 1, wherein an initial value of the vehicle speed limit value is a value that is greater than zero and is set taking into consideration acceleration performance at start of traveling.

3. The vehicle speed control device for an industrial vehicle according to claim 2, wherein the initial value is reduced in accordance with the rotation speed of the engine.

4. A vehicle speed control device for an industrial vehicle, wherein the vehicle speed control device is configured to be mounted on an industrial vehicle that performs a traveling operation and a cargo handling operation by using an engine as a drive source, and is configured to control a vehicle speed of the industrial vehicle, the vehicle speed control device comprising:
 a vehicle speed detector that is configured to detect an actual vehicle speed of the industrial vehicle; and
 a controller that is configured to control the vehicle speed of the industrial vehicle by controlling a rotation speed of the engine, wherein
 the controller is configured to:
  derive a vehicle speed limit value that is obtained by adding a predetermined limit value to the actual vehicle speed detected by the vehicle speed detector,
  set an upper limit value of the vehicle speed to the vehicle speed limit value, and
  control the rotation speed of the engine such that the actual vehicle speed follows the vehicle speed limit value.

5. The vehicle speed control device for an industrial vehicle according to claim 4, wherein an initial value of the vehicle speed limit value is a value that is greater than zero and is set taking into consideration acceleration performance at start of traveling.

6. The vehicle speed control device for an industrial vehicle according to claim 5, wherein the initial value is reduced in accordance with the rotation speed of the engine.

7. A vehicle speed control device for an industrial vehicle, wherein the vehicle speed control device is configured to be mounted on an industrial vehicle that performs a traveling operation and a cargo handling operation by using an engine as a drive source, and is configured to control a vehicle speed of the industrial vehicle, the vehicle speed control device comprising:
 a sensor configured to detect whether an accelerator pedal is being operated;
 a vehicle speed detector that is configured to detect an actual vehicle speed of the industrial vehicle; and
 a controller programmed to:
  control the vehicle speed of the industrial vehicle by controlling a rotation speed of the engine,
  derive a first vehicle speed limit value that increases during an operated state of the accelerator pedal and decreases during a non-operated state of the accelerator pedal, and a second vehicle speed limit value that is obtained by adding a predetermined limit value to the actual vehicle speed detected by the vehicle speed detector,
  employ the second vehicle speed limit value as a third vehicle speed limit value when a deviation between the first vehicle speed limit value and the actual vehicle speed is greater than or equal to a predetermined threshold value, and
  set an upper limit value of the vehicle speed to the third vehicle speed limit value, and control a rotation speed of the engine such that the actual vehicle speed follows the third vehicle speed limit value.

8. The vehicle speed control device for an industrial vehicle according to claim 7, wherein an initial value of the vehicle speed limit value is a value that is greater than zero and is set taking into consideration acceleration performance at start of traveling.

9. The vehicle speed control device for an industrial vehicle according to claim 8, wherein the initial value is reduced in accordance with the rotation speed of the engine.

* * * * *